United States Patent
Hajek et al.

(10) Patent No.: US 8,536,254 B2
(45) Date of Patent: Sep. 17, 2013

(54) CURABLE CASTING COMPOUND CONTAINING KERATIN FIBERS AND PLASTIC MOULDED PARTS PRODUCED THEREFROM

(75) Inventors: Andreas Hajek, Weingarten (DE); Thomas Marz, Sinsheim (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 0 days.

(21) Appl. No.: 13/373,897

(22) Filed: Dec. 5, 2011

(65) Prior Publication Data

US 2012/0149808 A1 Jun. 14, 2012

Related U.S. Application Data

(63) Continuation of application No. PCT/EP2010/057268, filed on May 26, 2010.

(30) Foreign Application Priority Data

Jun. 8, 2009 (DE) .......................... 10 2009 025 225

(51) Int. Cl.
C08L 89/00 (2006.01)
C08L 89/04 (2006.01)
D06M 14/24 (2006.01)
C08K 7/02 (2006.01)

(52) U.S. Cl.
USPC ............. 524/10; 524/492; 524/261; 524/442; 524/9; 524/17; 524/704; 428/339; 428/113; 428/355 CP

(58) Field of Classification Search
USPC ................... 524/10, 12, 492, 261, 442, 9, 17, 524/704; 264/202; 428/339, 113, 355 CP
See application file for complete search history.

(56) References Cited

U.S. PATENT DOCUMENTS

| | | | | |
|---|---|---|---|---|
| 3,318,826 A | * | 5/1967 | Bridgeford | ............... 523/207 |
| 4,169,706 A | * | 10/1979 | Kruchen | ............... 8/94.1 R |
| 4,579,774 A | * | 4/1986 | Kuwazuru et al. | .......... 428/300.4 |
| 5,218,013 A | | 6/1993 | Schock | ............ 523/209 |
| 5,710,204 A | | 1/1998 | Harke et al. | .............. 524/494 |
| 5,753,741 A | | 5/1998 | Harke et al. | .............. 524/494 |
| 6,841,253 B2 | | 1/2005 | Hajek et al. | ............... 428/421 |
| 2005/0080184 A1 | * | 4/2005 | Hajek et al. | ............... 524/492 |
| 2005/0148703 A1 | | 7/2005 | Barone et al. | ............. 524/100 |
| 2007/0014952 A1 | | 1/2007 | Delong et al. | ............. 428/35.7 |

FOREIGN PATENT DOCUMENTS

| | | |
|---|---|---|
| DE | 38 32 351 | 4/1990 |
| EP | 0 361 101 | 5/1995 |
| EP | 0 716 097 | 6/1996 |
| EP | 1 207 180 | 5/2002 |
| GB | 1 112 471 | 5/1968 |
| NL | 1026627 * | 7/2004 |
| WO | WO 95/26368 | 10/1995 |
| WO | WO 00/28872 | 5/2000 |
| WO | WO 01/27175 | 4/2001 |
| WO | WO 03/080716 | 10/2003 |
| WO | WO 2005/065301 | 7/2005 |
| WO | WO 2005/071000 | 8/2005 |

OTHER PUBLICATIONS

H.K. Ahn et al., Biodegradability of injection molded bioplastic pots containing polylactic acid and poultry feather fiber, Bioresource Technology 102 (2011) 4930-4933.*
A.L. Martínez-Hernández, et al., Dynamical-mechanical and thermal analysis of polymeric composites reinforced with keratin biofibers from chicken feathers, Composites: Part B 38 (2007) pp. 405-410.
A.L. Martínez-Hernández, et al., Mechanical properties evaluation of new composites with protein biofibers reinforcing poly(methyl methacrylate), Polymer 46 (2005), pp. 8233-8238.
Anonymous, "Polymer Reinforcement" (online), 2007, CG2 NanoCoatings, Inc.

* cited by examiner

Primary Examiner — James J Seidleck
Assistant Examiner — Deve E Valdez

(57) ABSTRACT

In order to provide a curable casting compound for producing plastic molded parts, comprising a binder component based on polymerizable monomers selected from methyl acrylate or methyl methacrylate and a proportion of about 40 to about 85% by weight of one or more inorganic fillers, which compound can be used for producing plastic molded parts having an increased impact strength, it is proposed that the casting compound comprise 0.1 to 0.5% by weight of keratin fibers.

17 Claims, 1 Drawing Sheet

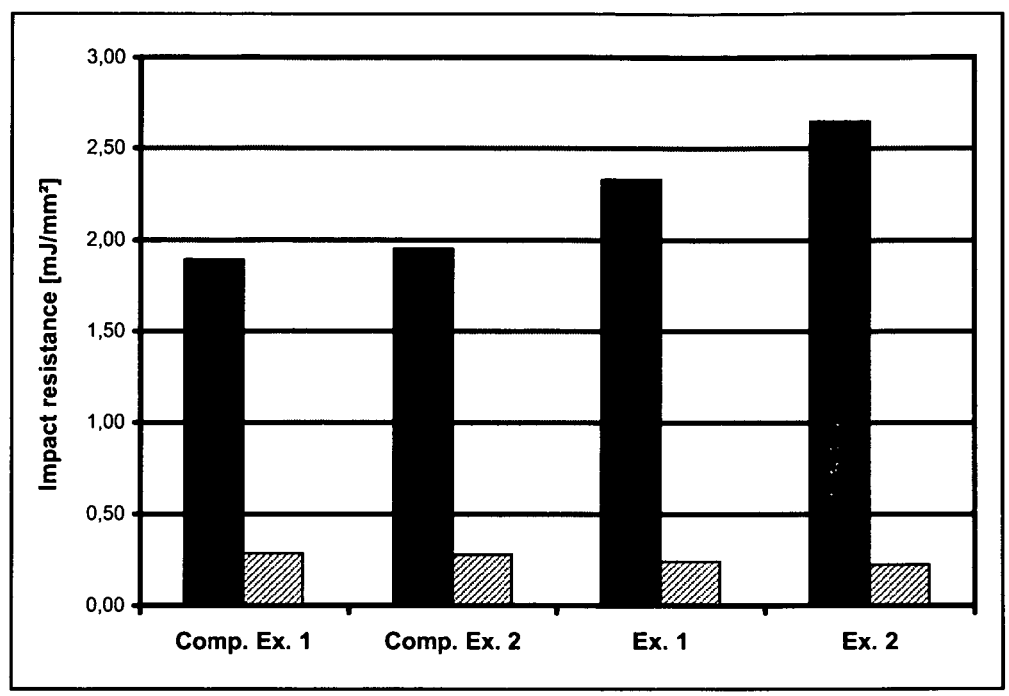

CURABLE CASTING COMPOUND CONTAINING KERATIN FIBERS AND PLASTIC MOULDED PARTS PRODUCED THEREFROM

This application is a continuation of International Application No. PCT/EP2010/057268 filed May 26, 2010, which claims priority of German application No. 10 2009 025 225.8 filed Jun. 8, 2009.

FIELD OF THE INVENTION

The present invention relates to a curable casting compound for producing plastic moulded parts, comprising a binder component based on a polymerisable monomer and a proportion of about 40 to about 85% by weight of one or more inorganic fillers.

BACKGROUND OF THE INVENTION

Casting compounds of this type have been used for a long time in the kitchen and sanitary sector to produce kitchen sinks, kitchen worktops, washbasins, bathtubs and the like. The relatively high proportion of inorganic filler, which is distributed in the polymer matrix formed from the binder component, is necessary here to obtain the material properties required for this sector of use, such as, for example, an adequate temperature resistance and scratch resistance of the surface. In addition, a visual structuring of the surface of the plastic moulded parts, such as, for example, a decorative granite surface, can be achieved by the selection of the filler (s).

The production of kitchen and sanitary articles from curable casting compounds has already been repeatedly described in the prior art, for example in DE 38 32 351 A1 or WO 2005/071000 A1.

The relative brittleness of the material caused by the—necessary—high filler content has proven to be disadvantageous in these plastic moulded parts. As a result, the resistance to impact and shock loads, i.e. the impact resistance of the plastic moulded parts, is sometimes not adequately high. Kitchen sinks and the like, both during use and during transportation, are regularly subjected to impact and shock loads of this type.

The invention is therefore based on the object of proposing a curable casting compound, with which plastic moulded parts with an increased impact resistance can be produced.

SUMMARY OF THE INVENTION

This object is achieved according to the invention in the casting compound of the type mentioned at the outset in that the casting compound comprises keratin fibres.

By adding keratin fibres, it was surprisingly possible to achieve a significant increase in the impact resistance of the plastic moulded parts produced with an otherwise unchanged composition of the casting compound. This reinforcing effect of keratin fibres is remarkable to the extent that these are not so-called high-modulus fibres (such as, for example, aramid fibres). The fact should also be mentioned in this context, that a corresponding effect cannot be achieved, for example, by the addition of glass fibres, the reinforcing effect of which is known.

The use of keratin fibres according to the invention is also advantageous in that a special surface coating of the fibres is not necessary in order to ensure an adequate adhesion between the fibres and the polymer matrix. In addition, a very uniform distribution of the keratin fibres in the casting compound or in the cured polymer matrix can be achieved without problems. In contrast, a silanisation of the surface is generally necessary with glass fibres, and a settling of the fibres during the curing of the casting compound is frequently observed, which leads to a non-homogeneous distribution.

The proportion of keratin fibres in the casting compound is advantageously about 0.1 to about 0.5% by weight. Below about 0.1% by weight, the corresponding effect is hardly pronounced, and at more than about 0.5% by weight a clustering together of individual fibres partially occurs. A proportion of keratin fibres from about 0.15 to about 0.35% by weight is preferred, particularly good results being achieved in the range from about 0.2 to about 0.3% by weight.

The keratin fibres used in the context of the present invention are preferably short fibres with a length of up to about 10 mm. In contrast to longer fibres, the manageability, the processing and the uniform distribution of the fibres in the casting mass are favoured by this. Keratin fibres having a length of up to about 5 mm, in particular, a length of about 1 to about 5 mm are particularly advantageous.

The diameter of the keratin fibres is generally in the range from about 10 to about 50 μm. The above-described advantages can be achieved, in particular, with fibre diameters from about 20 to about 25 μm.

Keratin is a water-insoluble structural protein, which is the main component of mammalian hair, but also of feathers, nails and horns. The keratin fibres used in the present case are preferably obtained from mammalian hair, in particular from sheep's wool.

The keratin fibres used for the invention are advantageously obtained by combing out sheep's wool and cutting it to the desired length. The fibres are preferably additionally degreased, as the adhesion between the fibres and the binder component or the cured polymer matrix is improved thereby. Suitable methods for degreasing are known in the prior art.

Various types of monomers can be used for the binder component in the context of the invention, methyl acrylate or methyl methacrylate, which, after curing, lead to moulded bodies based on acrylic resin, being particularly preferred. To increase the viscosity of the casting compound, the binder component may comprise a proportion of prepolymerised polymethyl acrylate (PMA) or polymethyl methacrylate (PMMA).

The proportion of the inorganic filler(s) in the casting compound is preferably in the range from about 60 to about 80% by weight. The materials known from the prior art, in particular quartz, cristobalite, tridymite, glass, aluminium trihydroxide, woolastonite or mixtures thereof can be used as fillers.

The inorganic filler preferably comprises granular particles with a mean diameter of about 0.1 to about 1 mm. By selecting the particle size, in particular also by using a plurality of filler fractions with different particles sizes, a visually pleasing, structured surface of the plastic moulded part can be obtained, in particular the decorative granite surface already mentioned at the outset.

To achieve special effects, the inorganic filler can additionally comprise particles in the form of fibres, whiskers or needles.

The materials, which are in each case recommended in WO 95/26368 A1, EP 0 716 097 A1, WO 01/27175 A1, WO 03/080716 A1, EP 1 207 180 A1 and WO 2005/071000 A1, can also be used, in particular, as the binder component and as the inorganic filler.

In a further embodiment of the invention, the curable casting compound additionally comprises an organosiloxane functionalised with an unsaturated group. By the addition of organosiloxanes of this type, the dirt-repelling effect of the surface of the plastics material moulded components can be increased, as described in WO 03/080716 A1. The cleaning of the corresponding kitchen and sanitary articles is thereby facilitated.

The present invention furthermore relates to the use of the casting compound according to the invention for producing kitchen or sanitary articles, in particular kitchen sinks, kitchen worktops, washbasins, bathtubs and the like.

Furthermore, the invention relates to plastic moulded parts, which are produced by using the casting compound according to the invention.

This and further advantages of the invention will be described in more detail below with the aid of the examples with reference to the drawing, in which in detail:

BRIEF DESCRIPTION OF THE DRAWINGS

FIG. 1 shows a graph relating to the impact-resistance of plastic moulded parts according to Examples 1 and 2 and Comparative Examples 1 and 2.

DETAILED DESCRIPTION OF THE INVENTION

Examples

1. Production of the Casting Compound

Firstly, the binder component is produced in that 2.0 kg polymethyl methacrylate (PMMA) with a molecular weight in the range from 50,000 to 250,000 g/mol are dissolved in 8.0 kg methyl methacrylate (MMA). 200 g trimethylolpropane trimethacrylate (TRIM) as the cross-linker are added to this mixture, as well as various peroxides (for example Peroxan BCC, Laurox and Trigonox).

To produce the casting compound for the Comparative Examples 1 and 2 and Examples 1 and 2, the binder component is mixed with an inorganic filler, a functionalised organosiloxane and, where appropriate, glass fibres or keratin fibres and the mixture is homogenised. The respective weight ratios of the individual components are given in the following Table 1:

TABLE 1

|  | Comparative Example 1 | Comparative Example 2 | Example 1 | Example 2 |
|---|---|---|---|---|
| Binder | 22.70% by weight | 22.70% by weight | 23.575% by weight | 24.456% by weight |
| Filler | 72.50% by weight | 72.25% by weight | 71.500% by weight | 70.492% by weight |
| Siloxane | 4.80% by weight | 4.80% by weight | 4.800% by weight | 4.802% by weight |
| Glass fibres | — | 0.25% by weight | — | — |
| Keratin fibres | — | — | 0.125% by weight | 0.250% by weight |

The inorganic filler is quartz sand with a mean particle size in the range from 0.1 to 0.5 mm (Dorsilit No. 9; company Dorfner, Hirschau). The component "siloxane" is an approximately 8% by weight mixture of an acrylate-functionalised organosiloxane in the binder component (Tegomer V-Si 7255, company Goldschmidt AG, Essen).

Silanised glass fibres with a length of 4 mm and a diameter of 10 µm (according to the manufacturer's information) were used for the glass fibres in Comparative Example 2 (EC 10 701 ThermoFlow®; Johns Manville Corporation, Denver, USA).

Keratin fibres obtained by combing out, cutting and degreasing sheep's wool were used for Examples 1 and 2 according to the invention. The keratin fibres have a length in the range from about 3 to 5 mm and a diameter in the range from 20 to 25 µm.

2. Production of the Plastic Moulded Parts

The homogenised and evacuated casting compound is introduced into a corresponding moulding tool for a kitchen sink (filling time about 60 seconds) and the moulding tool heated to about 95° C. After about 12 minutes, the upstream casting compound is disconnected and the moulding tool is kept at the aforementioned temperature for a further 18 minutes. Cooling then takes place and the plastic moulded part is demoulded.

3. Measurement of the Impact Resistance

The impact resistance is measured for each Example or Comparative example on ten samples in each case, which are cut out of the basin base of the kitchen sinks by means of a parting-off grinder. These samples have a length of about 80 mm, a height of about 6 mm and a width of about 10 mm, the width corresponding to the thickness of the basin base of the kitchen sinks.

The impact resistance is determined with a pendulum impact tester (company Zwick, Ulm) in accordance with DIN EN ISO 179-1 (narrow-side impact). In connection therewith, the samples are placed against the two abutments (spacing 62 mm) in such a way that the impact direction runs along the width of the sample (i.e. from the visible sink side to the rear of the sink) and the hammer edge of the pendulum impinges in the centre of the sample. The impact resistance (in $mJ/mm^2$) can be calculated from the display of the measuring apparatus (impact energy in % absorbed to break the sample) and from the maximum impact energy (500 mJ) corresponding to the pendulum used and the dimensions of the area of fracture (width×height).

4. Results

A very homogenous distribution of the keratin fibres in the polymer matrix was to be observed when viewed in backlighting in the case of kitchen sinks according to Examples 1 and 2. In contrast, inhomogeneities occurred in the Comparative Example 2 by a sinking of the glass fibres during curing.

The impact resistance values of the kitchen sinks determined by the above method according to Comparative Examples 1 and 2 and Examples 1 and 2 are given in the following Table 2, this in each case being the mean value of measurements on ten samples. In addition, the standard deviation is given.

TABLE 2

|  | Comparative Example 1 | Comparative Example 2 | Example 1 | Example 2 |
|---|---|---|---|---|
| Impact resistance [$mJ/mm^2$] | 1.893 | 1.950 | 2.329 | 2.647 |
| Standard deviation [$mJ/mm^2$] | 0.286 | 0.279 | 0.240 | 0.224 |

The impact resistances of the various kitchen sinks (solid bars) and the standard deviations (hatched bars) are shown graphically in a graph in FIG. 1.

The examples show that the impact resistance of filled plastic parts can already be increased by the addition of only 0.125% by weight keratin fibres from less than 2.0 $mJ/mm^2$ to more than 2.3 $mJ/mm^2$. With a proportion of 0.25% by weight, even values above 2.6 $mJ/mm^2$ are achieved, while when adding the same quantity of glass fibres, no comparable effect can be observed.

The addition of keratin fibres according to the invention to curable casting compounds is therefore a simple and economical possibility for significantly increasing the resistance of kitchen sinks and other plastic moulded parts, which are used in the kitchen and sanitary sector, against impact and shock loads and to counteract the relative brittleness caused by the high filler content.

The invention claimed is:

1. A plastic molded part which is a kitchen article or sanitary article produced by using a curable casting compound comprising a binder component based on a polymerisable monomer and a proportion of about 40 to about 85% by weight of one or more inorganic fillers, wherein the casting compound comprises keratin fibers that are obtained from mammalian hair and are free from a surface coating.

2. The plastic molded part according to claim 1, wherein the proportion of keratin fibers in the casting compound is about 0.1 to about 0.5% by weight.

3. The plastic molded part according to claim 2, wherein the proportion of keratin fibers is about 0.15 to about 0.35% by weight.

4. The plastic molded part according to claim 3, wherein the proportion of keratin fibers is about 0.2 to about 0.3% by weight.

5. The elastic molded part according to claim 1, wherein the keratin fibers have a length of up to about 10 mm.

6. The plastic molded part according to claim 5, wherein the keratin fibers have a length of up to about 5 mm.

7. The plastic molded part according to claim 6, wherein the keratin fibers have a length of about 1 to about 5 mm.

8. The plastic molded part according to claim 1, wherein the keratin fibers have a diameter of about 10 to about 50 μm.

9. The plastic molded part according to claim 8, wherein the keratin fibers have a diameter of about 20 to about 25 μm.

10. The plastic molded part according to claim 1, wherein the keratin fibers are obtained from sheep's wool by combing out and cutting the sheep's wool.

11. The plastic molded part according to claim 1, wherein the keratin fibers are degreased.

12. The plastic molded part according to claim 1, wherein the binder component comprises methyl acrylate or methyl methacrylate as the monomer.

13. The plastic molded part according to claim 12, wherein the binder component comprises a proportion of prepolymerised polymethyl acrylate or polymethyl methacrylate.

14. The plastic molded part according to claim 1, wherein the inorganic filler is selected from quartz, cristobalite, tridymite, glass, aluminium trihydroxide, wollastonite or mixtures thereof.

15. The plastic molded part according to claim 1, wherein the inorganic filler comprises granular particles with a mean diameter of about 0.1 to about 1 mm.

16. The plastic molded part according to claim 1, wherein the inorganic filler comprises particles in the form of fibers, whiskers or needles.

17. The plastic molded part according to claim 1, wherein the casting compound comprises an organosiloxane functionalised with an unsaturated group.

\* \* \* \* \*